(12) United States Patent  (10) Patent No.: US 8,981,737 B2
Huang et al.  (45) Date of Patent: Mar. 17, 2015

(54) HIGH EFFICIENCY PFM CONTROL FOR BUCK-BOOST CONVERTER

(75) Inventors: Congzhong Huang, Plano, TX (US); Shea Petricek, Dallas, TX (US)

(73) Assignee: Intersil Americas LLC, Milpitas, CA (US)

( * ) Notice: Subject to any disclaimer, the term of this patent is extended or adjusted under 35 U.S.C. 154(b) by 269 days.

(21) Appl. No.: 13/341,496

(22) Filed: Dec. 30, 2011

(65) Prior Publication Data

US 2012/0229110 A1    Sep. 13, 2012

Related U.S. Application Data

(60) Provisional application No. 61/450,487, filed on Mar. 8, 2011, provisional application No. 61/567,420, filed on Dec. 6, 2011.

(51) Int. Cl.
*H02M 3/158* (2006.01)

(52) U.S. Cl.
CPC .................................. *H02M 3/1582* (2013.01)
USPC ........................................... 323/259; 323/271

(58) Field of Classification Search
CPC ............................ H02M 3/158; H02M 3/1582
USPC .................................. 323/259, 271, 225, 344
See application file for complete search history.

(56) References Cited

U.S. PATENT DOCUMENTS

| 8,350,543 | B2 * | 1/2013 | Loikkanen et al. | 323/259 |
| 2006/0284606 | A1 | 12/2006 | Chen et al. | |
| 2009/0003021 | A1 | 1/2009 | Tsukamoto | |

FOREIGN PATENT DOCUMENTS

| CN | 101499717 | 8/2009 |
| JP | 2003011392 | 1/2003 |

* cited by examiner

*Primary Examiner* — Harry Behm
*Assistant Examiner* — Matthew Grubb
(74) *Attorney, Agent, or Firm* — Paul A. Bernkopf; Bryan A. Santarelli; Lane Powell PC

(57) ABSTRACT

A buck/boost voltage regulator generates a regulated output voltage responsive to an input voltage and a plurality of control signals. The buck/boost voltage regulator includes a plurality of switching transistors responsive to the plurality of control signals. Control circuitry monitors the regulated output voltage and generates the plurality of control signals responsive thereto. The control circuitry controls the operation of the plurality of switching transistors to enable a charging phase in a first mode of operation, a pass through phase in a second mode of operation and a discharge phase in a third mode of operation within the buck/boost voltage regulator to eliminate occurrence of a four switch switching condition.

23 Claims, 13 Drawing Sheets

HIGH EFFICIENCY PFM CONTROL FOR BUCK-BOOST CONVERTER

PRIORITY CLAIM

This application claims priority from U.S. Provisional Application No. 61/567,420, filed Dec. 6, 2011, entitled HIGH EFFICIENCY PFM CONTROL FOR BUCK BOOST CONVERTER, and from U.S. Provisional Application No. 61/450,487, filed Mar. 8, 2011, entitled HIGH EFFICIENCY PFM CONTROL FOR BUCK-BOOST CONVERTER, the specification of which is incorporated herein in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
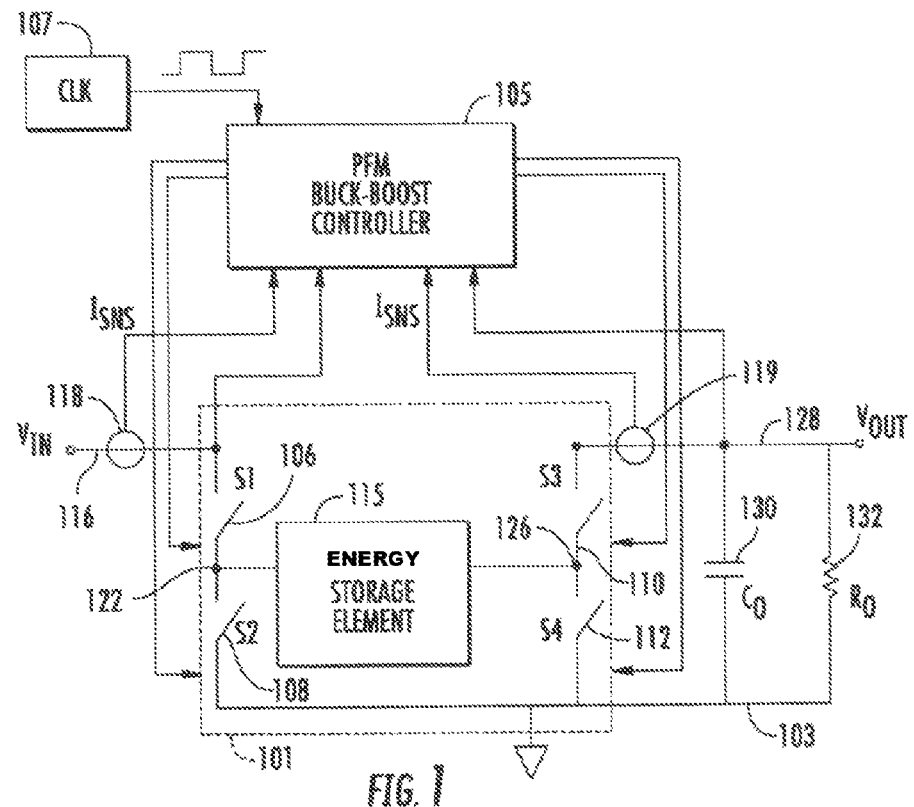
FIG. 1 illustrates a top level view of a PFM buck-boost DC/DC converter.

Referring now to the drawings, wherein like reference numbers are used herein to designate like elements throughout, the various views and embodiments of a system and method for high efficiency PFM (Pulse Frequency Modulation) control of buck-boost converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic view at a high level for a Pulse Frequency Modulation (PFM) buck-boost DC/DC converter. The DC/DC converter is comprised of a switching bridge 101 that is operable to transfer charge from a voltage input terminal 116 labeled $V_{IN}$ to transfer charge to a energy storage element 115 and then transfer this charge to a load configured as a parallel capacitor 130 labeled $C_O$ and resistor 132 $R_O$ disposed between a voltage output terminal 122 labeled $V_{OUT}$ and a reference voltage on a node 103, which reference voltage is typically disposed at ground. The bridge 101 is controlled by a PFM buck-boost controller 105 which operates in accordance with a Pulse Frequency Modulation (PFM) mode of operation. This PFM operation is divided into two operations, one for charging the energy storage element 115 and one for transferring the energy stored therein to the load. The PFM operation varies the ratio between these two operations, as will be described hereinbelow. A clock input from a clock 107 provides the time base for the PFM operation.

The bridge 101 is an H-bridge. This is comprised of two nodes 122 and 126 with an energy storage element 115 disposed therebetween. A first switch 106 is connected between the input node 116 and a node 122. A second switch 108 is connected between a node 106 and reference node 103. These two switches 106 and 108, as will be described hereinbelow, are typically used for the buck side of a buck-boost converter. The other side of the H-bridge is comprised of a first switch 110 connected between the output voltage terminal 128 and the node 126 on the other side of the energy storage element 115, and a second switch 112 is connected between node 122 and the reference node 103. The switches 110 and 112 are typically used for the boost portion of a buck-boost converter. However, the H-bridge configuration allows versatility in how the charge is transferred to the energy storage element 115 and then from the energy storage element 115 to the output terminal 128, as will be described in more detail hereinbelow.

Figure 1A:
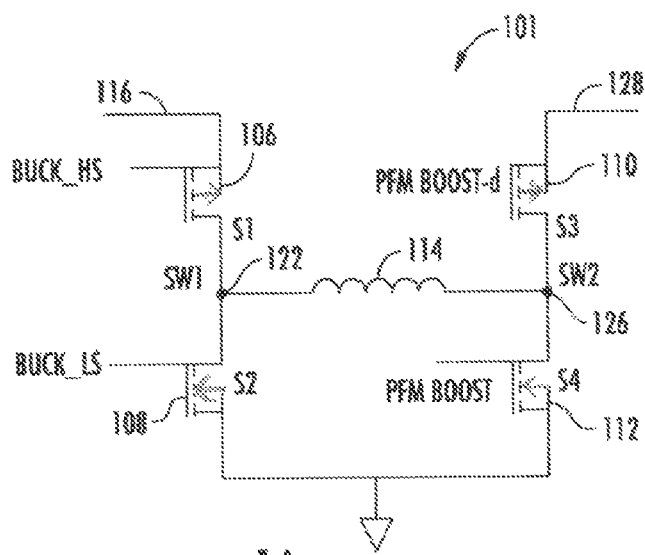
FIG. 1A illustrates a detailed schematic diagram of the H-Bridge switch.

Referring now to FIG. 1A, there is illustrated a more detailed diagrammatic view of the implementation of the H-bridge 101. In this configuration, the switch 106 is configured with a p-channel transistor, switch 108 is configured with an n-channel transistor, switch 110 is configured with a p-channel transistor and a switch 112 is configured with an n-channel transistor. The signals that control the gates of transistors 106 and 108 are the BUCK_HS and BUCK_LS signals, respectively. Similarly, the signals that control the gates of transistors 110 and 112 are PFM Boost-d and PFM Boost, respectively. The term "switch" for the elements 106, 108, 110 and 112 will be interchangeable with the term "transistor" for the same elements throughout this Specification. The energy storage element 115 is comprised of an inductor 114 connected between the nodes 122 and 126.

Figure 2A:
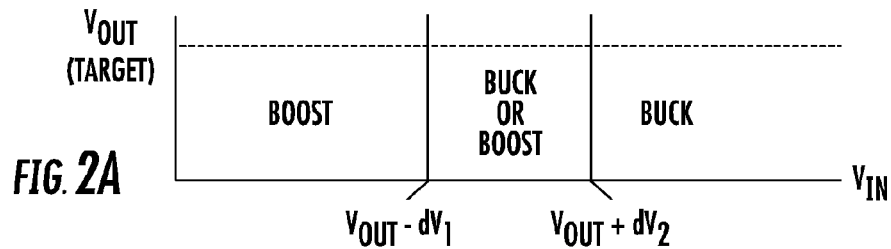
FIG. 2 illustrates a diagrammatic view of the different operational modes of operation for the buck-boost converter as a function of the input voltage.

Referring now to FIG. 2A, there is illustrated a plot of input voltage as a function of the buck-boost mode relating to a target $V_{OUT}$ voltage. This $V_{OUT}$ voltage is illustrated by a dashed line. When the input voltage is less than $V_{OUT\text{-}TARGET} - dV_1$, the DC/DC converter operates in the boost mode. When $V_{IN}$ is between the voltage $V_{OUT\text{-}TARGET} +$ $dV_2$, and $V_{OUT\text{-}TARGET}-dV_1$, the DC/DC converter operates in either the buck or boost mode. If $V_{IN}$ is greater than $V_{OUT\text{-}TARGET}+dV_2$, the DC/DC converter operates in the buck mode. When operating in the buck-boost mode, this is typically referred to as a "transition" phase.

Figure 2B:
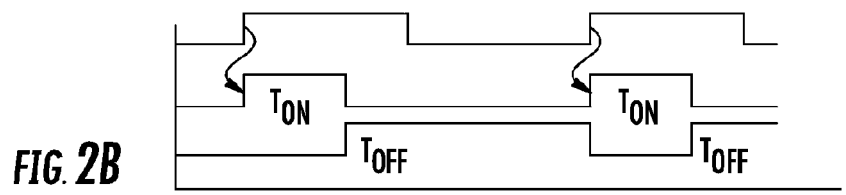

The DC/DC converter operates utilizing Pulse Frequency Modulation (PFM), which is sometimes referred to as the Pulse Frequency Mode. This utilizes a fixed clock frequency wherein the energy storage element 115, e.g., inductor 114, is charged up for a time duration $T_{ON}$ followed by a transfer operation for a time duration $T_{OFF}$. By varying the ratio between $T_{ON}$ and $T_{OFF}$, the amount of energy transferred to the load can vary as illustrated in FIG. 2B. In the boost mode, for example, transistor 106 is closed and transistors 110 and 112 are switched for store and transfer operations, as will be described in more detail hereinbelow. To charge the inductor in the boost mode, i.e., to store energy therein, the node 126 is pulled to ground by closing transistor 112 and opening transistor 110 with transistor 106 closed. This is the phase labeled $T_{ON}$ in FIG. 2B. At the end of the $T_{ON}$ period, transistor 112 is opened and transistor 110 is closed, transferring energy to the output terminal 128, this being labeled the $T_{OFF}$ period which extends to the next occurring edge of the clock. By varying the ratio of the duration of these two $T_{ON}$ and $T_{OFF}$ periods, the amount of charge transferred to the load can be varied. This is described in more detail hereinbelow with respect to the operation of the controller 105 in the boost mode.

The operation of the boost mode will be described in the following figures. In general, there will be three states that are present in the boost mode of the disclosed embodiment. There will be a first charge phase to store energy in the inductor 114 followed by a second transfer state which partially transfers energy from the inductor 114 to the load 332 and a third transfer state that fully transfers the energy in the inductor 114 to the load.

Figure 3A:
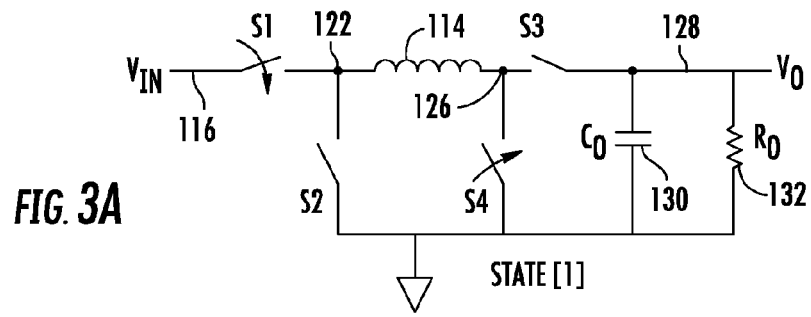
FIGS. 3A and 3B illustrate one state of the switch operation for the boost mode illustrating the switch states and the associated timing diagrams.
Figure 3B:
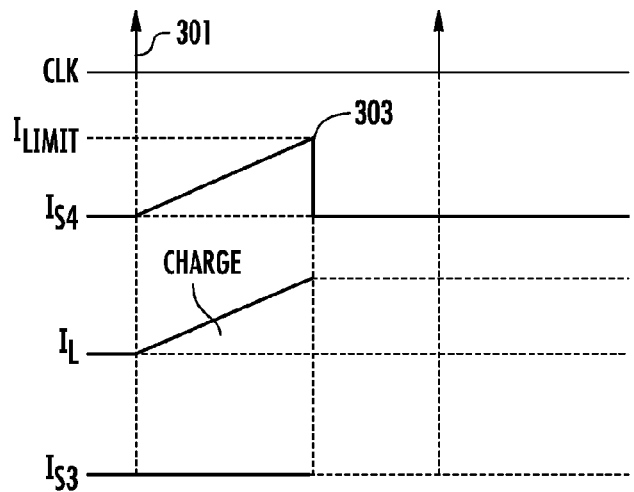

Referring to FIG. 3A, there is illustrated a diagrammatic view of the switches illustrated in a simplified diagrammatic view. For simplicity purposes, transistor 106 is labeled S1, transistor 108 is labeled S2, transistor 110 is labeled S3 and transistor 112 is labeled S4, with only the designations S1, S2, S3 and S4 illustrated. In the first state, labeled STATE [1], the charge operation is illustrated. In this operation, S1 is closed and S2 is opened such that the voltage $V_{IN}$ of terminal 116 is connected to node 122, and node 122 is connected to one side of the inductor 114. The other side of the inductor 114 is connected to node 126, which node 126 is connected to the reference voltage via a switch S4, with switch S3 opened. This will allow the inductor current to ramp up. FIG. 3B illustrates this operation. The switch configuration of FIG. 3A in the first state is initiated at a clock edge 301. The current through the switch S4 is illustrated with the waveform $I_{S4}$ illustrating the current ramping up to a point 303 at a current limit. This is a predetermined current value to which the current stored in the inductor 114 can ramp to. Once the current is detected as being at that level, switch S4 will be opened at point 303, which is the time of the peak of the current in the inductor 114, which is illustrated in FIG. 3B as the waveform labeled $I_L$, to end the charge operation.

Figure 4A:
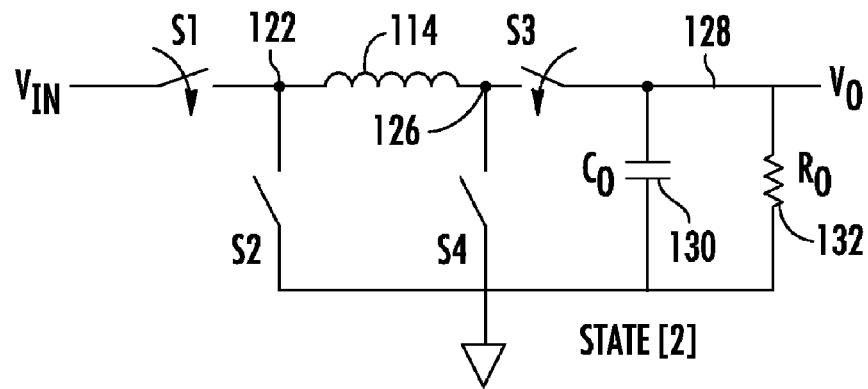
FIGS. 4A and 4B illustrate a second state of the switch operation for the boost mode illustrating the switch states and associated timing diagrams.
Figure 4B:
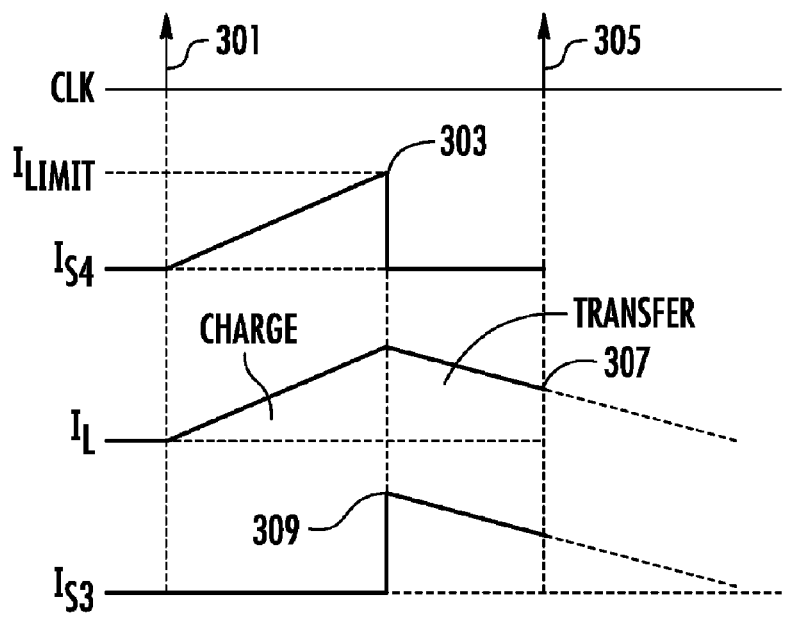

Referring now to FIGS. 4A and 4B, there is illustrated a simplified diagrammatic view of the switches in STATE [2] and the associated timing diagram. When the inductor current has reached the predetermined current limit, as described hereinabove, the state is switched from STATE [1] to STATE [2], wherein switch S4 is opened and switch S3 is closed at point 303. This results in node 126 being connected to the output terminal 128 and to resistor 132. This type of operation is sometimes referred to as the "ringing inductor" operation wherein the voltage across the inductor 114 is reversed, since the current therethrough cannot change instantaneously. Therefore, the voltage on the side of the inductor connected to node 126 will be higher than the voltage on the node 122. This will cause current to flow to node 128 when connected thereto, thus raising its voltage. This will cause a charge transfer to occur until the end of the clock period at the next clock edge 305. This operation between the time at point 303 and the clock edge 305 will result in a decrease in the inductor current $I_L$ indicating a transfer of energy to the load. However, the operation is such that only a partial amount of the energy stored in the inductor will be transferred and, therefore, the inductor current will not be reduced to a zero current level. This is indicated at point 307. Similarly, it can be seen that the current through switch S3 will initially rise to the peak current level at which the inductor current is disposed at a point 309 when closed to indicate current flowing therethrough to node 128. The current through switch S3 is a combination of current from the inductor 114 and current sourced from $V_{IN}$. This current will track the inductor current to the point 307, at which time the PFM cycle will change to the next State. The current at this point 307 is not at a zero level.

In this STATE [2], the voltage $V_{IN}$ is connected to the load through the inductor 114. Thus, current will flow from the inductor 114 (stored energy) and also from the node 122 sourced by $V_{IN}$. When $V_{IN}$ is approximately equal to $V_{OUT}$, the voltage across the inductor 114 will be approximately zero, but current will still flow from $V_{IN}$.

Figure 5A:
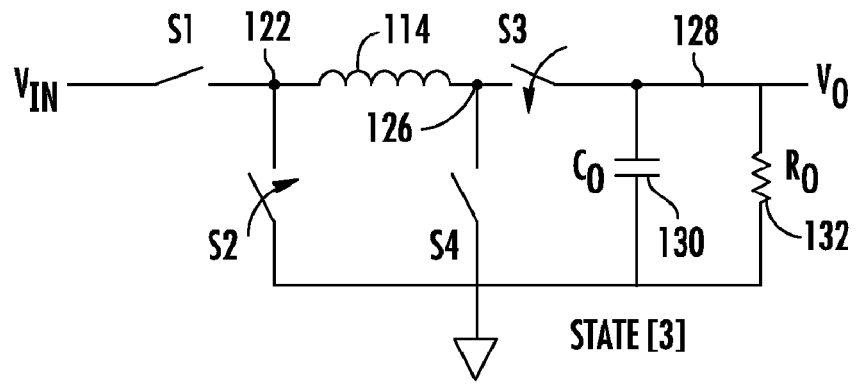
FIGS. 5A and 5B illustrate a third state of the switch operation for the boost mode illustrating the switch states and the associated timing diagrams.
Figure 5B:
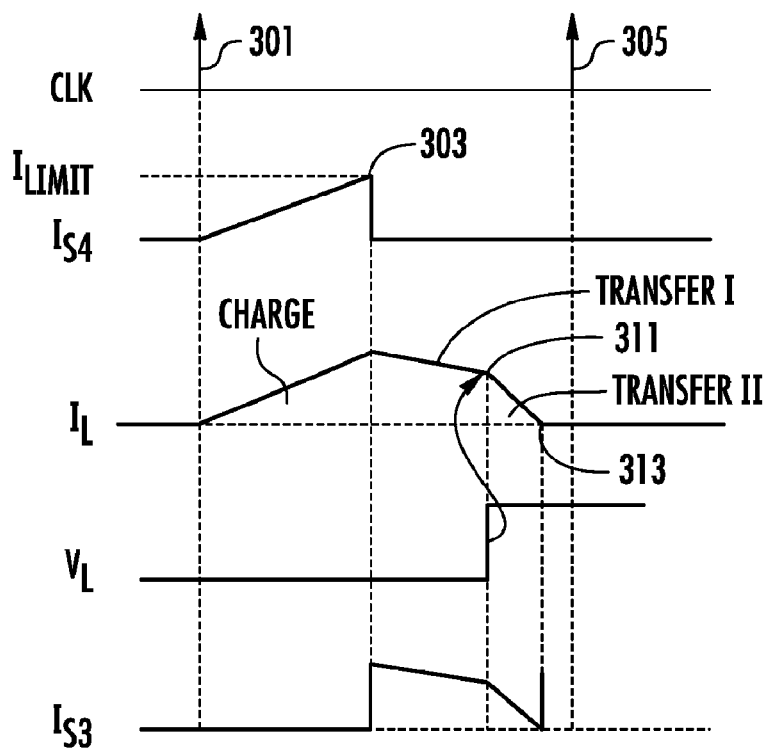

Referring now to FIGS. 5A and 5B, there is illustrated the third state, STATE [3], for both a simplified diagrammatic view of the switch and an associated timing diagram. In this state, the transfer operation of STATE [2] will be prematurely terminated at a point 311 prior to the occurrence of the next occurring clock edge 305. The state illustrated in FIG. 5A begins at point 311. At this point, an event is detected, such as reaching the voltage limit, i.e., the target voltage. This will result in switch S1 opening and switch S2 closing. When this occurs, the rate of transfer of energy from the inductor 114 to the node 128 will increase, thus increasing the rate of transfer of energy to the load and the rate of current $I_L$ from the inductor 114. This is due in part because no additional current is sourced from $V_{IN}$. When the current $I_L$ reaches a value of zero, at a point 313, as determined by current sensor 119, the switch S2 and the switch S3 will be opened, as this indicates the DC/DC converter is at the target voltage and no further energy needs to be transferred to the output load. This can be seen with respect to the current through S3, which goes from the peak current through the inductor down to a zero current.

Figure 6:
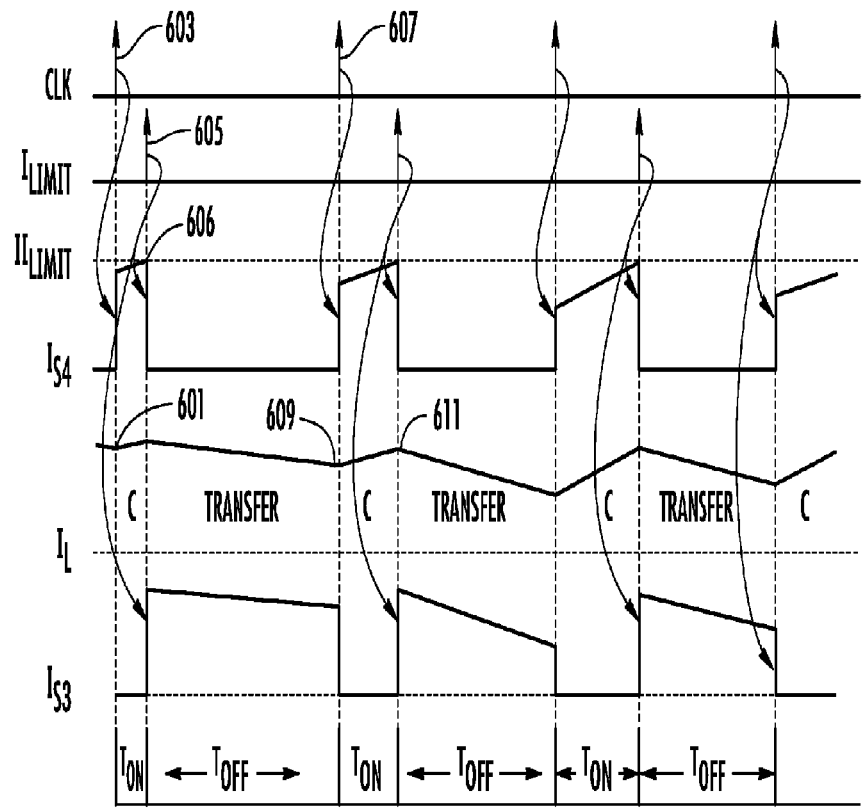
FIG. 6 illustrates a timing diagram for boosting the voltage using the first and second states in a PFM operation.

Referring now to FIG. 6, there is illustrated a timing diagram for the operation in one embodiment where STATE [1] and STATE [2] are sequentially sequenced through. The STATE [1] is the charge cycle and is represented by $T_{ON}$ indicating that S1 is closed and S4 is closed and STATE [2] is illustrated by $T_{OFF}$ representing S1 on, S4 off and S3 on. In this illustration, the current in the inductor 114 has never been fully discharged (i.e., has not gone to zero) at the beginning of the operation. The prior occurring state was described with respect to the timing diagram of FIG. 4B wherein, at point 307, the inductor 114 has not been fully discharged and, as such, when the clock edge 305 occurs, energy is left in the inductor 114. This results in a current level at the initiation of the next charge cycle or the beginning of the next STATE. Thus, at a point 601, the current at the end of the previous STATE [2] will be at a level greater than zero. At this point, at a clock edge 603, switch S1 is closed and switch S3 is opened and the current through switch S4 at the clock edge 603 is already high but it is not at the peak level, the level of $I_{LIMIT}$, the predetermined current limit for the inductor 114. Thus, additional charge will be transferred to the inductor 114 during this STATE. When the current through the inductor 114 reaches $I_{LIMIT}$, switch S3 will close and switch S4 will open. The current level of $I_{LIMIT}$ is set at a sufficiently high level to ensure there will be enough energy stored in inductor 114 for expected load levels. Thus, when the current level is reached, at a current limit edge 605, the current through the inductor 114 and through switch S1 will reach $I_{LIMIT}$ at a point 606 and, when switch S4 opens, this will be the current level through switch S3 initially in STATE [2]. Current will be transferred to the load and energy will be depleted from the inductor 112 and, since the side of the inductor 114 on the node 126 connected to the load has a voltage that is initially higher than the input voltage, the voltage on the load will rise above $V_{IN}$ and energy will be transferred thereto, thus decreasing energy in the inductor and decreasing the current through the inductor. This transfer operation of energy from the inductor 114 to the load will occur until the next clock edge, clock edge 607. At clock edge 607, switch S4 is closed and switch S3 is opened for the next PFM cycle initiated with STATE [1].

Depending upon the load value and the current transferred to the load, the amount of energy removed from the inductor 114 will cause the slope of current depletion from the inductor 114 to be greater or lesser, this being a function of both the value of the load and the voltage between $V_{IN}$ and $V_{ON}$. Thus, at the next clock cycle 607, the current level may be lower than at point 601. In this illustration, at a point 609 on the inductor current waveform, the level of the inductor current at point 609 is lower than the current at point 601. This will result in the inductor 114 requiring additional time to charge back up to the current $I_{LIMIT}$ at a point 611 which increases the time $T_{ON}$. Since the time $T_{ON}$ increases, the time $T_{OFF}$ must decrease such that less time is allowed for transfer of energy from the inductor to the load. Thus, since the period of the clock is fixed, the amount of time between $T_{ON}$ and $T_{OFF}$ will dynamically vary. It should be understood that, since this is a boost operation and that node 122 is connected to $V_{IN}$ through the switch S1 during the transfer state during STATE [1], current is transferred from both the inductor 114 and from $V_{IN}$. Thus, when the voltage $V_{IN}$ and $V_{OUT}$ are substantially equal at the transition reached between boost and buck operations, the decrease in current from the beginning to the end of $T_{OFF}$ will be very little. This is illustrated in FIG. 7.

Figure 7:
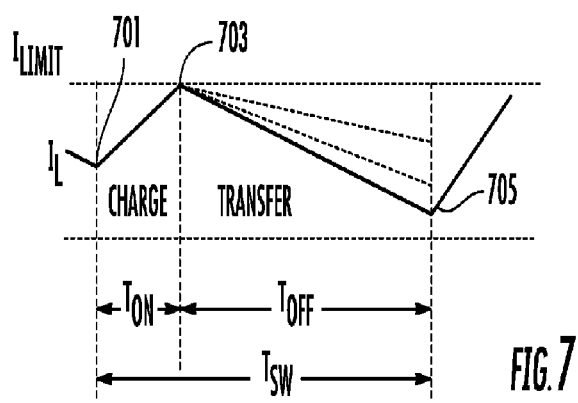
FIG. 7 illustrates the inductor current for a single cycle of the PFM operation of FIG. 6.

With respect to FIG. 7, there is illustrated one cycle of the clock between a point 701 where switch S4 is closed at an initial current in the previous STATE. Depending on the level of the current, the duration of time $T_{ON}$ will change until the current reaches $I_{LIMIT}$ at a point 703. This will initiate the next state, STATE [2], for the transfer operation. The length of this time relative to $T_{ON}$ depends upon the level of current at point 701. The lower the current level, the longer the duration of $T_{ON}$ and the lesser the duration of $T_{OFF}$. During $T_{OFF}$, the transfer rate is a function of the load and the voltages between $V_{IN}$ and $V_{OUT}$. Thus, it can be seen that the slope of the transfer, i.e., the rate at which energy is transferred from the inductor, is depicted with dotted lines illustrating that the slope could be flat, if the voltages are substantially equal, to a steep slope. However, it can be seen that the inductor current does not fall to the zero crossing and only a portion of the energy in the inductor 114 is transferred from the inductor 114 such that, at the beginning of the next STATE [1], at a point 705, the current through the inductor 114 is not zero. It can be seen that, by not allowing the current through the inductor 114 to go to zero, or to go below (cross) zero, there will be no requirement to open switch S1 to prevent current from flowing from the load to the inductor 114, and thus there will be less output ripple and less switching, since switch S2 has not closed to fully transfer the charge as per STATE [3] described above. As described hereinbelow with respect to FIGS. 5A and 5B, at some point during $T_{OFF}$, switch S2 is closed and switch S1 is opened to increase the rate at which energy is discharged from the inductor, since current is no longer being supplied by $V_{IN}$ and, once fully discharged at the zero crossing, all switches S1, S2, S3 and S4 are opened to tri-state nodes 122 and 126.

With further reference to FIG. 7, it can be seen that the fixed clock will provide a clock period of $T_{SW}$ between clock edges. The peak current level and $T_{SW}$ are selected such that, for all load levels and voltage levels of $V_{IN}$, $V_{OUT}$ and $V_{OUT-TARGET}$ (or $V_{LIMIT}$), the current $I_L$ will not fall to a zero current level. Thus, rather than have a fixed $T_{ON}$, $T_{ON}$ varies and the ratio of $T_{ON}/T_{OFF}$ varies to continually transfer charge during $T_{OFF}$ without the requirement to terminate connection of the inductor to the load until the target voltage is met. This is with respect to a switching operation where switch S3 is a make or break switch as opposed to a diode that will reverse bias at close to zero current.

Figure 8:
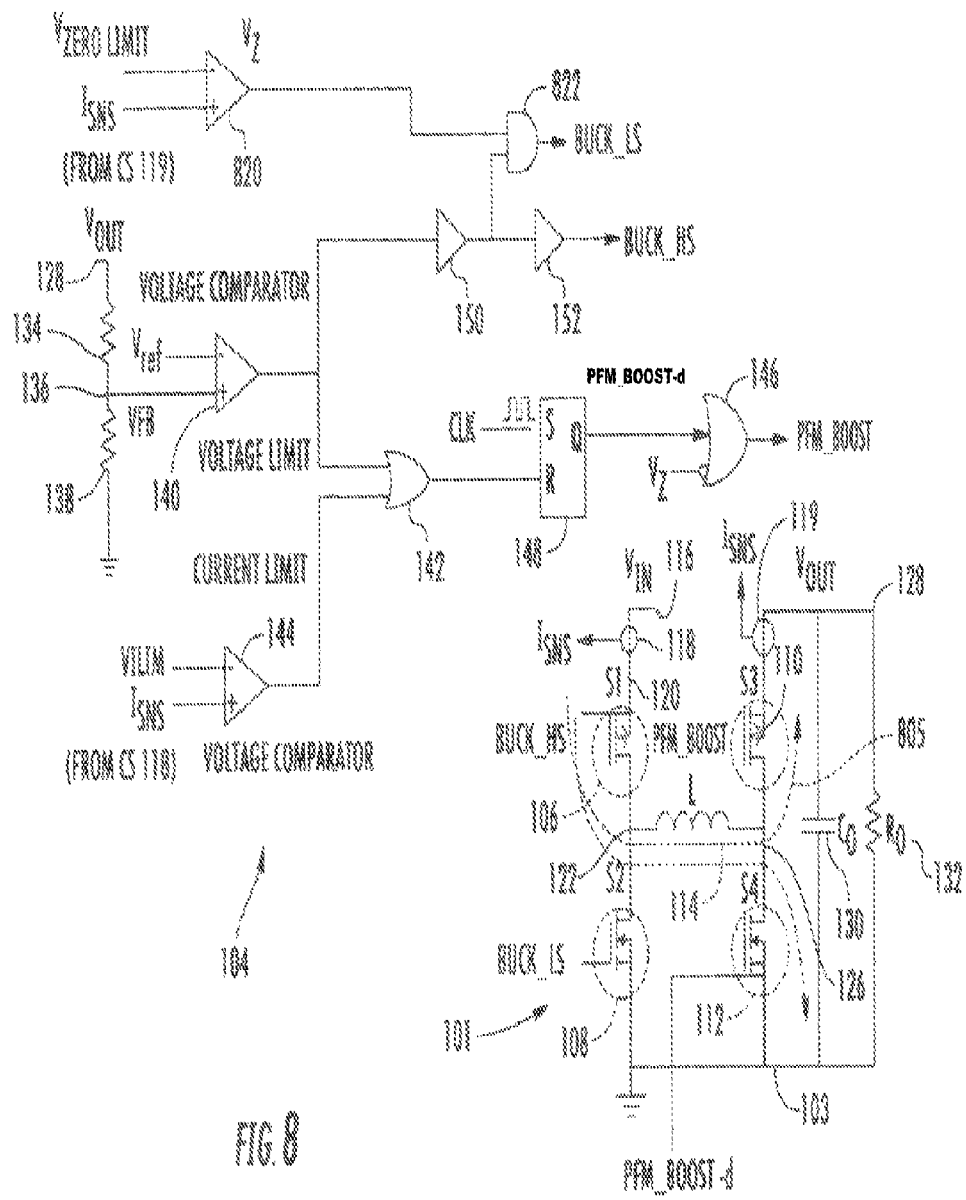
FIG. 8 illustrates a first embodiment of the boost operation of the buck-boost converter and associated control circuitry having an improved boost PFM control scheme.

Referring now to FIG. 8, there is illustrated a detail of the boost operation of the buck-boost converter, illustrating an H-Bridge 102 and associated boost control circuitry 104 associated with a first embodiment of a boost PFM (Pulse Frequency Modulation) control scheme that utilizes a pass through phase of STATE [2] between the charge and discharge phases of STATE [1] and STATE [3] in order to avoid a four switch switching condition during the boost operation. A four switch switching condition occurs when each of the four switching transistors within a buck-boost converter are switching between one of a logical high or a logical low state at a same period in time. This occurs at the transition of the buck-boost converter from the charge phase to the discharge phase or from the discharge phase to the charge phase if only STATE [1] and STATE [3] were used. The charge phase occurs when the inductor current through the inductor 114 of the buck-boost converter is increasing, and the discharge phase occurs when the inductor current through the buck-boost converter is decreasing towards a zero crossing level. By introducing a transfer operation in a "pass through" phase during boost PFM operation between STATE [1] and STATE [3], the PFM boost mode of operation utilizes a charge phase in STATE [1] followed by a pass through phase in STATE [2] to partially transfer the energy stored in the inductor 114 to the load and then including a discharge phase in STATE [3] at some time within the charging operation to fully discharge the inductor 114. The pass through phase operation connects $V_{IN}$ to node 122 and node 126 to the output node 128 by turning on transistors 106 and 110 and enables the inductor current $I_L$ to flow from $V_{IN}$ to $V_{OUT}$ as illustrated generally at 805 as well as flow of current from inductor 114. When the pass through phase is present, there is no point in time at which a four switch switching condition occurs. This improves the efficiency of the buck-boost converter by up to 15% in the boost PFM mode of operation.

Referring now to the drawings, and more particularly to FIG. 8, there is illustrated the H-Bridge 102 and associated control circuitry 104 for a buck-boost converter operating according to an embodiment in the boost mode. The control circuitry 104 monitors the output voltage at node 128 using a resistor divider consisting of a resistor 134 connected between node 128 and node 136 and a resistor 138 connected between node 136 and ground. Node 136 provides the feedback voltage $V_{FB}$ to a non-inverting input of a voltage comparator 140. The non-inverting input of the voltage comparator 140 receives a reference voltage $V_{REF}$. The output of the voltage comparator 140 generates a voltage limit signal that is provided to a first input of an OR gate 142.

The other input of OR gate 142 is connected to receive a current limit signal from the output of a voltage comparator 144. The voltage comparator 144 receives the $I_{SNS}$ voltage signal from the current sensor 118 at its non-inverting input and the $V_{LIMIT}$ voltage limit signal at its inverting input. The output of the OR gate 142 is connected to the R input of SR latch 148. The SR latch 148 is reset dominant to prevent the clock signal CLK from setting the latch if its reset R input is logic "high", implementing pulse skipping, a form of PFM control. The output of OR gate 142 will generate a logical "high" value responsive to either the voltage limit signal or the current limit signal from the output of comparators 140 and 144, respectively, going to a logical "high" level. The voltage limit signal goes to a logical "high" level when the feedback voltage $V_{FB}$ exceeds the reference voltage $V_{REF}$. The current limit signal goes to a logical "high" level when the $I_{SNS}$ signal from the current sensor 118 exceeds the $V_{LIMIT}$ voltage.

The output of comparator 140 is also provided as an input to a buffer 150. The output of the buffer 150 is connected to one input of an AND gate 822 and provides the BUCK_LS signal which is provided as a control signal to the gate of transistor 108. The output of buffer 150 is connected to the input of a buffer 152 which provides the BUCK_HS signal at its output. The BUCK_HS signal is applied as a control signal to the gate of transistor 106.

The SR latch 148, in addition to receiving the output of the OR gate 142 at its R input receives a clock signal (CLK) at its S input. Responsive to the CLK signal and the output of the OR gate 142, the SR latch 148 generates the PFM_BOOST-d signal from its Q output. The PFM_BOOST-d signal is provided to one input of an OR gate 146 to generate a PFM_BOOST signal. The PFM_BOOST-d signal is provided to the gate of transistor 112 while the gate of transistor 110 is connected to the PFM_BOOST signal and the BUCK_HS and BUCK_LS signals are provided to the gates of transistors 106 and 108, respectively.

To implement the STATE [3] wherein the inductor 114 is connected between node 103 and node 128 with switch 108 turned on and switch 106 turned off and switch 110 turned on with switch 112 turned off, a comparator 820 is provided having the inverted input connected to a reference voltage indicating the level at which the current through the inductor 114 has been discharged to a zero value, as indicated by the current sensor 119. This is labeled $V_{ZEROLIMIT}$. The non-inverting input of comparator 820 is connected to the output of the current sensor 119. The output provides a logic "high" signal when the current is indicated as being above zero value and a logic "low" when the current falls to a value at or below the zero value. The output of comparator 820 is labeled $V_Z$ and is connected to the other input of the AND gate 822 which has the one input thereof connected to the output of the buffer 150, the output of the AND gate 822 providing BUCK_LS output. When the current is determined to be below zero value, the output of the AND gate 822 is low and turns off transistor 108. Similarly, the output of comparator 820 is connected to one input of the input OR gate 146, which input is an inverted input, the other input of the OR gate 146 connected to the output of the SR latch 148 and receiving the PFM_BOOST-d signal, the output of the OR gate 146 driving the gate of transistor 110. Thus, when the output $V_z$ of comparator 820 goes low, the $V_z$ signal input to the inverted input of OR gate 146 will cause the output PFM BOOST of the OR gate 146 to go high, thus turning off transistor 110. Since the output of OR gate 142 is high due to the voltage limit condition, this will result in a tri-state condition for the inductor 114.

Figure 9:
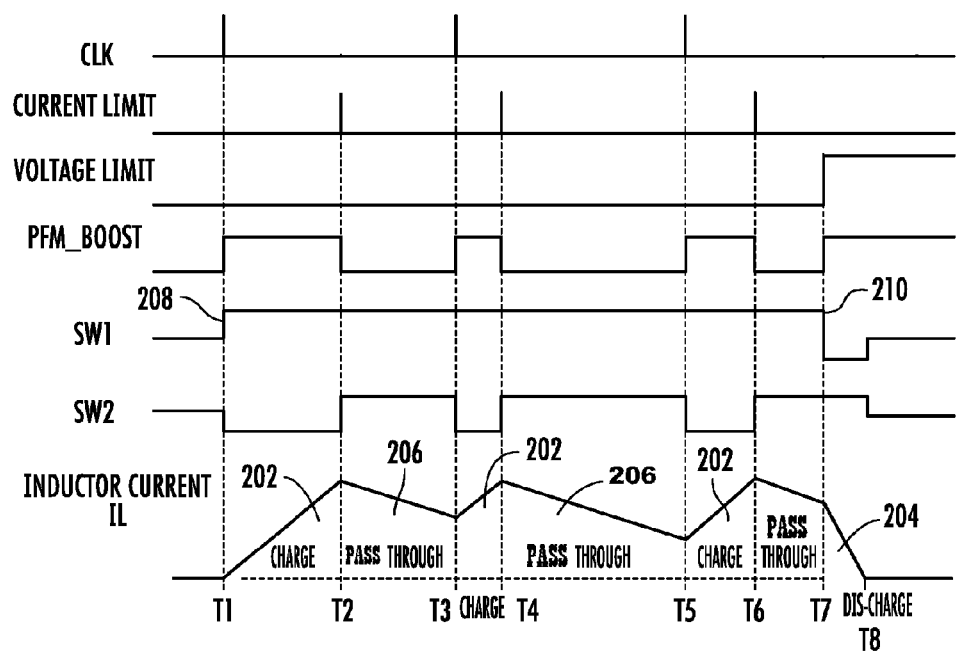
FIG. 9 illustrates the waveforms associated with the operation of the buck-boost converter of FIG. 8.

Referring now to FIG. 9, there is illustrated the operation of the buck-boost converter and associated control circuitry of FIG. 8 in buck-boost PFM operation of boost mode. For simplicity purposes, the node 122 will either be pulled to the voltage on node 118 or to the reference voltage on node 103 and will be referred to as being at a "high" level when at the voltage level of node 108 and at a "low" level when at the voltage level of node 103. The signal at node 122 will be labeled SW1. Similarly, the signal at node 126 will be pulled up to the voltage level of the output node 128 or down to the voltage level of node 103. The label for node 126 will be SW2 and, when the level is at the level of node 128, it will be referred to as being disposed at a "high" level and, when disposed at the voltage level of node 103, it will be referred to as being disposed at a "low" level. Both of the levels for nodes 122 and 126 will be represented as being at one of those two states or levels, it being understood that the state is in actuality a varying voltage level of either the reference voltage of node 103, the input voltage level or the output voltage level for the respective node. Also, when all switches are off, the voltage on the nodes 122 and 126 will "float" at a three-state level, sometimes referred to as a tri-state condition.

At time $T_1$, responsive to the clock signal going to a logical "high" level at the input of SR latch 148, the PFM_BOOST-d signal at the output of the SR latch 148 goes from a logical "low" level to a logical "high" level. Switches 108 and 110 are turned off and switches 106 and 112 are turned on. This causes switching node (SW1) 122 to go to a "high" level and switching node (SW2) 126 to go to a "low" level. This will cause the inductor current $I_L$ to begin increasing from time $T_1$ to time $T_2$. At time $T_2$, responsive to the current limit signal going to a "high" level, the PFM_BOOST-d signal will go from a logical "high" level to a logical "low" level. This causes the switching node SW2 (node 126) to go to a "high" level while switching node SW1 (node 122) remains at a "high" level when switch 110 turns on and switch 112 turns off. The inductor current $I_L$ decreases from time $T_2$ to time $T_3$. At time $T_3$, responsive to a next clock signal, the PFM_BOOST-d signal goes from a logical "low" level to a logical "high" level turning off transistor 110 and turning on transistor 112 terminating the charge transfer operation before the inductor current has reached the zero crossing level and thus leaving the inductor current at a non-zero level. This causes switching node SW2 126 to go to a "low" level while switching node SW1 122 remains "high." The inductor current then increases from the non-zero level from time $T_3$ to time $T_4$ in a subsequent inductor charge operation.

At time $T_4$, a current limit signal causes the PFM_BOOST-d signal to go from a logical "high" level to a logical "low" level turning on transistor 110 and turning off transistor 112, terminating the charge phase and initiating the next charge transfer phase. This causes switching node SW2 126 to go to a "high" level while switching node SW1 122 remains "high." The inductor current $I_L$ decreases from time $T_4$ to time $T_5$ during a charge transfer operation. At time $T_5$, responsive to another rising clock edge, the PFM_BOOST-d signal goes from a logical "low" to a logical "high" level driving switching node 126 SW2 to a low level (close to GND) by turning off transistor 110 and turning on transistor 112 while switching node 122 SW1 remains at a high level (close to $V_{IN}$) at a non-zero inductor current level. The inductor current increases from the non-zero level from time $T_5$ to time $T_6$. Responsive to another current limit signal at time $T_6$, the PFM_BOOST-d signal will go from a logical "high" level to a logical "low" level terminating the charge storage operation of the inductor. This again drives switching node 126 SW2 high (close to $V_{OUT}$) by turning on transistor 110 and turning off transistor 112. The inductor current then decreases from time $T_6$ to time $T_7$, $T_7$ occurring prior to the next clock edge.

At time $T_7$, the voltage limit signal goes from a logical "low" to a logical "high" level driving BUCK_HS to a logic "high" level. This drives switching node SW1 122 low when the voltage limit signal goes "high" while switching node SW2 126 remains high (close to $V_{OUT}$) by turning off transistor 106 and turning on transistor 108. The inductor current then decreases from time $T_7$ to time $T_8$. Thus, the buck-boost PFM mode of operation within the circuit of FIG. 1 includes charge phases 202 in a first mode of operation and discharge phases 204 in a third mode of operation. However, these charge phases 202 and discharge phases 204 are separated by pass through phases 206 in a second mode of operation which eliminate a four switch switching condition. As can be seen with respect to switch node SW1 122 and switch node SW2 126 switching signals during the entire PFM period, there occurs no four switch switching conditions.

The implementation of FIG. 8 enables the pass through phase until a next clock signal is received at the input of SR latch 148 and the inductor current $I_L$ is less than the PFM peak current limit or the voltage limit reaches a predetermined level for example 1.5% higher than a target value. If the clock edge occurs and the inductor current is less than the PFM peak current limit, the pass through will be followed by a charge phase as illustrated at time $T_3$ and time $T_5$. If the voltage limit is reached during a pass through phase, a discharge phase is enabled to discharge the inductor current to zero and complete the PFM operation as illustrated at time $T_7$.

Figure 10:
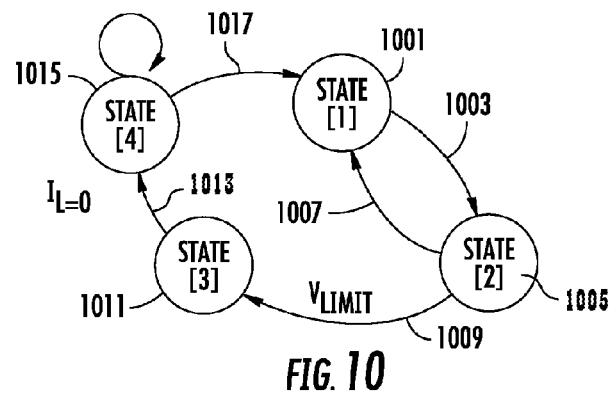
FIG. 10 illustrates a state diagram of the embodiment of FIGS. 8 and 9.

Referring now to FIG. 10, there is illustrated a state diagram for the operation of the disclosed embodiment of FIGS. 8 and 9. In this embodiment, as described hereinabove, the charge operation sequences through STATE [1] and STATE [2] until the voltage limit is reached representing the target voltage, at which time the energy of the inductor 114 is fully transferred in a discharge operation in STATE [3]. Thus, the boost operation is initiated in a STATE [1] block 1001 and the proceeds along a path 1003 to STATE [2] at block 1005. Until the voltage limit is reached, STATE [2] returns to STATE [1] at block 1001 through a path 1007. This will continue until the target voltage has been reached at a $V_{LIMIT}$ for the output voltage $V_{OUT}$. This state diagram will then go from STATE [2] at a block 1005 to STATE [3] at a block 1011. Once $I_L$ has been determined to equal zero, at a zero crossing, the state diagram will flow along path 1013 to a fourth state at block 1015 for STATE [4]. This state is the sleep state in which all switches are opened and the system will be maintained in this state until the voltage $V_{OUT}$ falls below the target or desired voltage, at which time the state diagram will pass along a path 1017 back to STATE [1] at block 1001.

Figure 11:
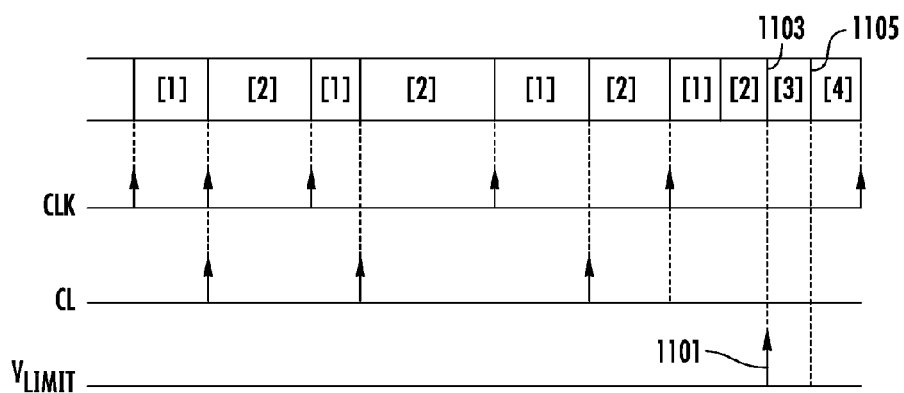
FIG. 11 illustrates the timing diagram for the state diagram of FIG. 10.

The state diagram of FIG. 10 is illustrated in a timing diagram of FIG. 11. In this diagram, it can be seen that the states sequence through STATE [1] and STATE [2] until the voltage limit $V_{LIMIT}$ has occurred at a point 1101. At this point, the state diagram changes from STATE [2] to STATE [3] at a point 1103. This will increase the discharge rate to a point 1105 at which time the zero crossing of the inductor current has been detected and STATE [4] will be entered thereafter. This will occur before the next clock edge. However, it should be understood that, if the voltage limit occurs close enough to the clock edge, it may be that the zero crossing does not occur before the next clock edge, but, since $V_{LIMIT}$ has been reached, this will be overwritten and switch S1 will be maintained open and switch S2 will remain closed until the zero crossing has occurred, at which time the system will pass to STATE [4] until the next clock edge.

Figure 12:
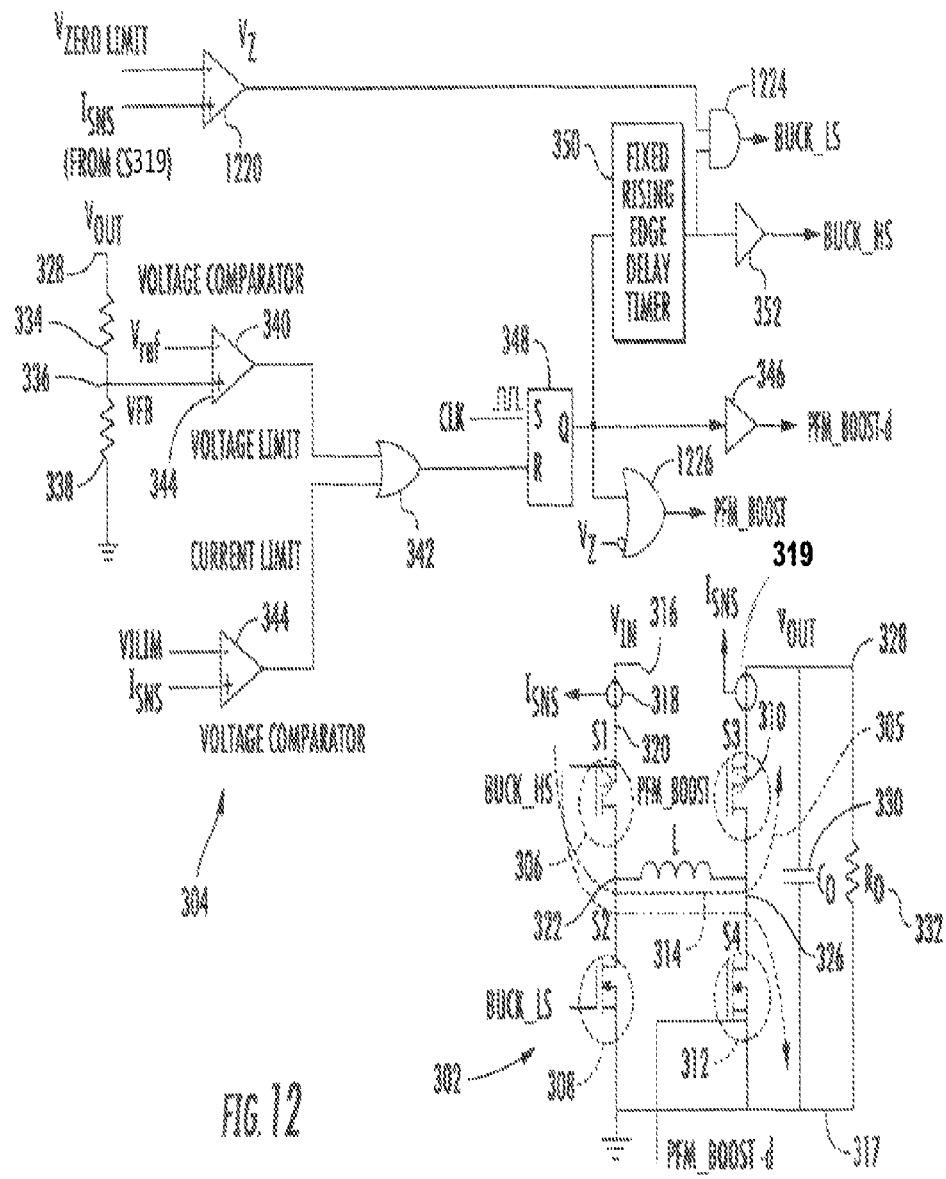
FIG. 12 illustrates an alternative embodiment of the boost operation of the buck-boost converter and associated control circuitry with an improved buck-boost PFM control scheme.

Referring now to FIG. 12, there is illustrated an alternative embodiment of a buck-boost converter and control circuitry having improved PFM operation in the boost mode. The buck-boost converter 302 includes four switching transistors 306, 308, 310 and 312 and an inductor 314. The input voltage $V_{IN}$ is applied at an input voltage node 316. A current sensor 318 monitors the input current applied through the input voltage node 316 and generates a signal $I_{SNS}$ comprising a voltage associated with the input current and a current sensor 319 monitors the output current through transistor 310 to voltage node 328 and generates a signal $I_{SNS}$ comprising a voltage associated with the output current. Transistor 306 has its source/drain path connected between node 320 and node 322. A transistor 308 has its drain/source path connected between node 322 and a reference node 317 connected to a reference voltage such as ground. Inductor 314 is connected between node 322 and node 326. Transistor 310 has its source/drain path connected between the output voltage node $V_{OUT}$ 328 and node 326. Transistor 312 has its drain/source path connected between node 326 and node 317. A capacitor 330 is connected between node 328 and node 317, and a resistor 332 is in parallel with the capacitor 330 between node 328 and node 317. The gates of transistors 310 and 312 are connected to receive the PFM_BOOST and signals PFM-BOOST-d, respectively, from the control circuitry 304.

The control circuitry 304 monitors the output voltage at node 328 using a resistor divider consisting of a resistor 334 connected between node 328 and node 336 and a resistor 338 connected between node 336 and ground. Node 336 provides the feedback voltage $V_{FB}$ to a non-inverting input of a voltage comparator 340. The inverting input of the voltage comparator 340 receives a reference voltage $V_{REF}$. The output of the voltage comparator 340 generates a voltage limit signal that is provided to a first input of an OR gate 342.

The other input of OR gate 342 is connected to receive a current limit signal $V_{LIMIT}$ from the output of a voltage comparator 344. The voltage comparator 344 receives the $I_{SNS}$ voltage signal from the current sensor 318 at its non-inverting input and the VILIM voltage limit signal at its inverting input. The output of the OR gate 342 is connected to the R input of SR latch 348. The SR latch 348 is reset dominant to prevent the clock signal CLK from setting the latch if its reset R input is logic "high", implementing pulse skipping, a form of PFM control. The output of OR gate 342 will generate a logical "high" value responsive to either the voltage limit signal or the current limit signal from the output of comparators 340 and 344, respectively, going to a logical "high" level. The voltage limit signal goes to a logical "high" level when the feedback voltage $V_{FB}$ exceeds the reference voltage $V_{REF}$. The current limit signal goes to a logical "high" level when the $I_{SNS}$ signal from the current sensor 318 exceeds the VILIM voltage.

The SR latch 348, in addition to receiving the output of the OR gate 342 at its R input receives a clock signal (CLK) at its S input. Responsive to the CLK signal and the output of the OR gate 342, the Q output of the SR latch 348 is connected to one input of an OR gate 1226, the output thereof generating the PFM_BOOST signal. The Q output of the latch 348 is also connected to the input of a buffer 346 to generate a PFM-BOOST-d signal. The Q output of the SR latch 348 is input to the input of a fixed rising edge delay timer 350. The fixed rising edge delay timer 350 adds a delay to the PFM_BOOST-d signal and is input to one input of an AND gate 1224 to provide at its output the BUCK_LS signal, which is provided to the gate of transistor 308. The output of the delay timer 350 is also provided as an input to a buffer 352. The output of the buffer 352 provides the BUCK_HS signal. The PFM_BOOST-d and PFM-BOOST signals are provided to the gates of transistors 312 and 310, respectively, while the BUCK_HS signal is provided to the gate of transistor 306.

The control circuit 304 inserts a pass through phase after the charge phase that will last for a "fixed" period of time that is followed by the discharge phase. This method, while not eliminating the four switch switching conditions as occurs with respect to the implementation of FIG. 9, greatly reduces the number of four switch switching conditions which improves the overall efficiency of the buck-boost converter.

Referring further to FIG. 12, when the current through the inductor 314 is at a zero value in STATE [3], it is necessary to turn off transistor 308 and transistor 310. A comparator 1220 has the inverting input connected to a limit voltage $V_{ZEROLIMIT}$ and the non-inverting input connected to the output of the current sensor 319. When the inductor current is determined to have gone below the zero limit value, the output of the comparator 1220 will go low. The output of comparator 1220 is labeled $V_Z$, which is connected to the other input of the AND gate 1224. When $V_Z$ goes low, the output of AND gate 1224 will go low, turning off transistor 308. Similarly, the OR gate 1226 has an inverted input connected to the output of the comparator 1220, $V_Z$. Thus, when $V_Z$ falls low, the output of OR gate 1226 will be high which will turn off transistor 310, the P channel transistor. Thus, when zero current limit is exceeded and the voltage limit has been exceeded, the output of comparator 1220 being low and the output of comparator 340 being high will result in a tri-state condition for all of the switches. Further, the voltage limit being exceeded will also keep the SR latch 348 in a low output condition such that a rising clock edge will not perform a reset thereon.

Figure 13:
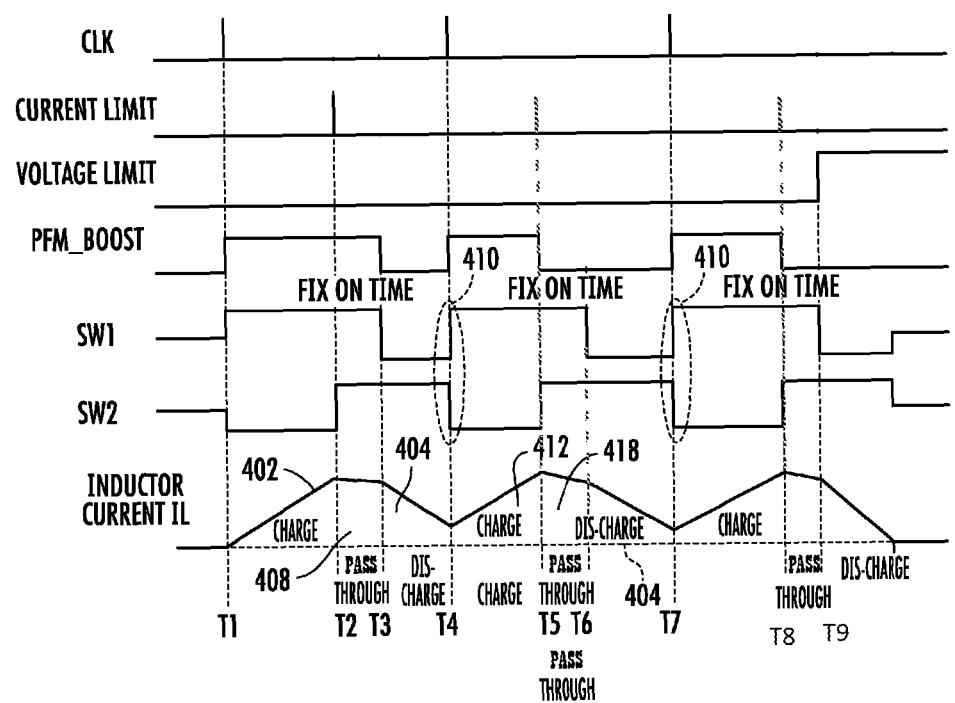
FIG. 13 illustrates the waveforms associated with the operation of the buck-boost converter of FIG. 12.

Referring now to FIG. 13, there is illustrated the operation of the buck-boost converter and control circuitry of FIG. 12 that includes a fixed pass through phase of operation after each charge phase. Responsive to a clock edge at time $T_1$, the PFM_BOOST and PFM-BOOST-d signals go from a logical "low" level to a logical "high" level causing switch 310 to turn off and transistor switch 312 turned on. This causes the voltage at switching node SW1 (node 322) to go to high level as switch 306 is turned on and switch 308 is turned off, and the voltage at switching node SW2 (node 326) to go to low level responsive to transistor 310 turning off and transistor 312 turning on. The inductor current $I_L$ begins increasing from time $T_1$ to time $T_2$. At time $T_2$, responsive to a logical "high" level of the current limit signal from the output of voltage comparator 344, the voltage at switching node SW2 (node 326) goes from a low level to a high level as switch 310 turns on and switch 312 turns off. This initiates a pass through period from time $T_2$ to time $T_3$ when the inductor current $I_L$ is decreasing and energy is transferred to the load. The period from time $T_2$ to time $T_3$ is a fixed on time established by the fixed rising edge delay timer 350. After expiration of the fixed on time at time $T_3$, the output signal of the delay timer 350 goes from a logical "low" to a logical "high" level causing the voltage at node SW1 (node 322), as transistor 306 turns off and transistor 308 turns on, to go from high to low level. The inductor current $I_L$ goes through a discharge phase from time $T_3$ to time $T_4$ or until a zero crossing occurs.

At time $T_4$, responsive to a rising clock edge, the PFM_BOOST signal goes from a logical "low" level to a logical "high" level causing switches 308 and 310 to turn off and switches 306 and 312 to turn on. This causes the voltage at switching node SW1 (node 322) to go from low level to high level and the voltage at switching node SW2 (node 326) to go from high to low level. This causes a four switch switching condition. The inductor current goes through another charge phase from time $T_4$ to time $T_5$. At time $T_5$ the PFM_BOOST signal goes from a logical "high" to a logical "low" level causing the voltage at switching node SW2 (node 326) to go from low to high level when switch 310 turns on and switch 312 is turned off. This initiates the pass through phase from time $T_5$ to time $T_6$ when the inductor current $I_L$ will decrease.

The pass through phase is for a fixed on time from time $T_5$ to time $T_6$ based upon the output of the fixed rising edge delay timer 350. After the fixed on time from time $T_5$ to time $T_6$, the voltage at node SW1 will go from high to low level responsive to switch 306 turning off and switch 308 turning on beginning initiation of the discharge phase at time $T_6$ to time $T_7$. At time $T_7$, another rising clock edge causes the PFM_BOOST signal to go from a logical "low" to a logical "high" level causing transistors 310 and 308 to turn off, transistors 306 and 312 to turn on, and the voltage at switching node SW1 (node 322) to go from low to high level while the voltage at switching node SW2 (node 326) goes from high to low level. This initiates the next charge period and a four switch switching condition occurs at time $T_7$.

The circuit of FIG. 12 includes a number of charge phases 402 in a first mode of operation and discharge phases 404 in a third mode of operation that are each separated by a fixed length pass through phase 408 in a second mode of operation. As can be seen with respect to the switching signals, a reduced number of four switch switching conditions occur at points 410 within the switching cycle of the switching transistors. This improves the efficiency of the operation of the circuit of the buck-boost converter, though not as much as that described with respect to FIG. 8.

Figure 14:
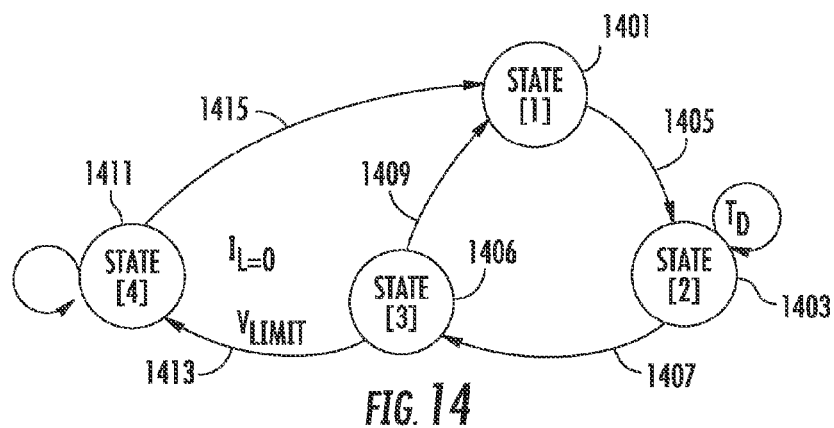
FIG. 14 illustrates a state diagram for the embodiment of FIGS. 12 and 13.

Referring now to FIG. 14, there is illustrated a state diagram depicting the operation of FIGS. 12 and 13 and the disclosed embodiment therein. The state diagram in FIG. 14, is initiated at a state block 1401 for STATE [1] and then flows to a block 1403 for STATE [2] along a path 1405. However, as noted hereinabove, after a predetermined time delay, the state will change from STATE [2] to STATE [3] at a block 1406 along a path 1407. At the next clock cycle, the state will change from STATE [3] to STATE [1] at the block 1401 along a path 1409. The state will continue to flow on paths 1405, 1407 and 1409 until a voltage limit is achieved. At this time, the state will be maintained within STATE [3] at block 1406 until the current to the inductor is equal to a zero value, i.e., it crosses zero. At this point, the state will change from STATE [3] at 1406, wherein switch S2 is closed and S1 is opened and S3 is closed and S4 is opened until such occurs. At this time, the state diagram will change to STATE [4] at a block 1411 along a path 1413. The system will remain in this state until the voltage falls below the $V_{LIMIT}$ target value, at which time the state will change to STATE [1] at block 1401 along a path 1415.

Figure 15:
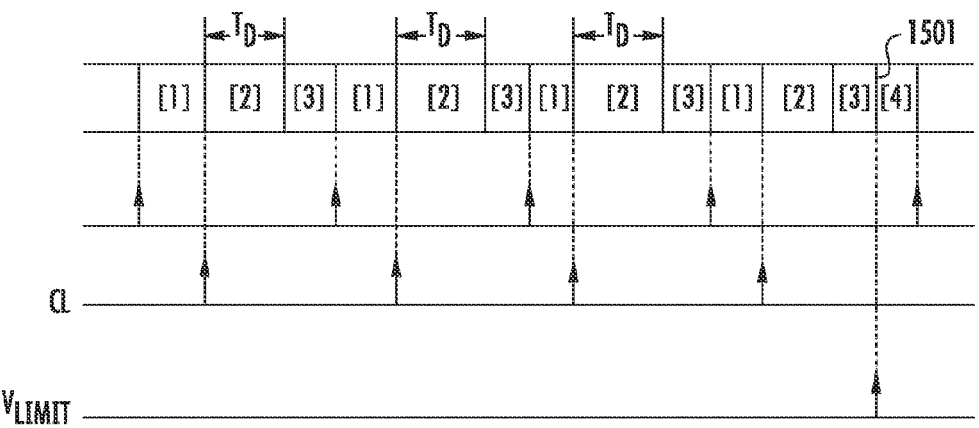
FIG. 15 illustrates a timing diagram for the state diagram of FIG. 14.

The timing flow of the state diagram of FIG. 14 is illustrated in FIG. 15. In this operation, it can be seen that STATE [2] is maintained for a predetermined amount of time, $T_D$. Thus, the clock edge initiates STATE [1], and the current of the inductor current $I_L$ equaling the current limit value, $I_{LIMIT}$ results in the change from STATE [1] to STATE [2]. At the end of the fixed delay, the system changes to STATE [3]. During the operation wherein the voltage has not reached the voltage limit, $V_{LIMIT}$, the next charging cycle will occur at the next clock cycle, i.e., STATE [1] will again be entered. This is a flow along paths 1405, 1407, and 1409. However, once $V_{LIMIT}$ is reached, then STATE [3] is forced to remain the existing state until the current charging the inductor has decreased to a zero value, even if the next clock edge occurs during that time. The system mode then goes to STATE [4] at a point 1501.

Figure 16:
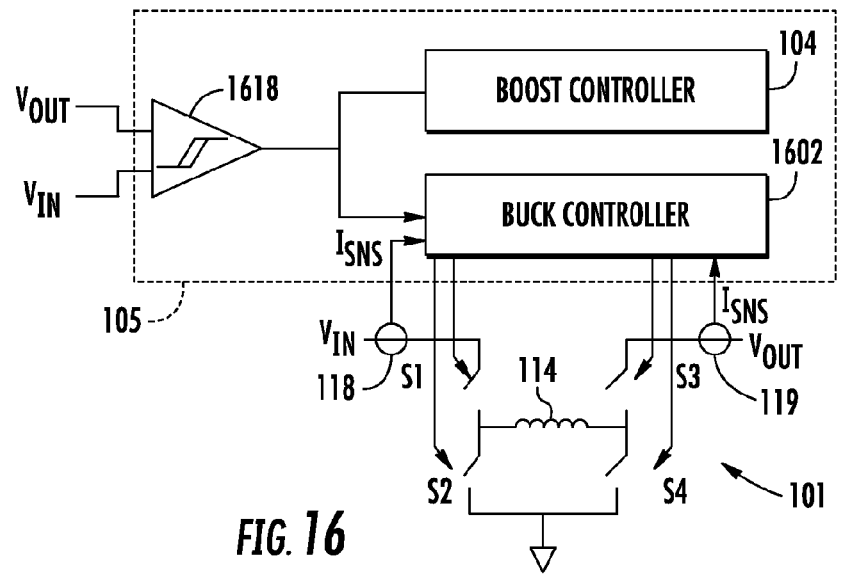
FIGS. 16 and 16A illustrate the operation of the buck side of the converter.

Referring now to FIG. 16, there is illustrated an upper level block diagram of the buck operation. The buck-boost controller 105 is comprised of two operations, as described hereinabove, the boost operation and the buck operation. Thus, there will be a control section associated with the boost operation, that being the boost controller 104 described hereinabove with respect to control of the boost operation. There will also be provided a buck controller 1602, which is operable to control the buck operation. In the buck operation, the H-Bridge 101 is controlled such that the buck side of the H-Bridge 101 is controlled to alternately switch S1 and S2 to a closed or open position in accordance with a buck operation and switch S4 will be maintained open and switch S3 maintained closed on the boost side of the H-Bridge 101. For a standard buck operation, inductor 114 is charged by connecting the buck side of the inductor 114 to $V_{IN}$ through switch $S_1$. Once charged, the charge is transferred by opening switch S1 and closing switch S2 and connecting the buck side of the inductor 114 to the reference voltage or ground. The charging operation increases the inductor current to the predetermined current limit and then switches to a discharge or charge transfer operation to reduce the inductor current to a zero value. This operates in accordance with a PFM operation.

Figure 16A:
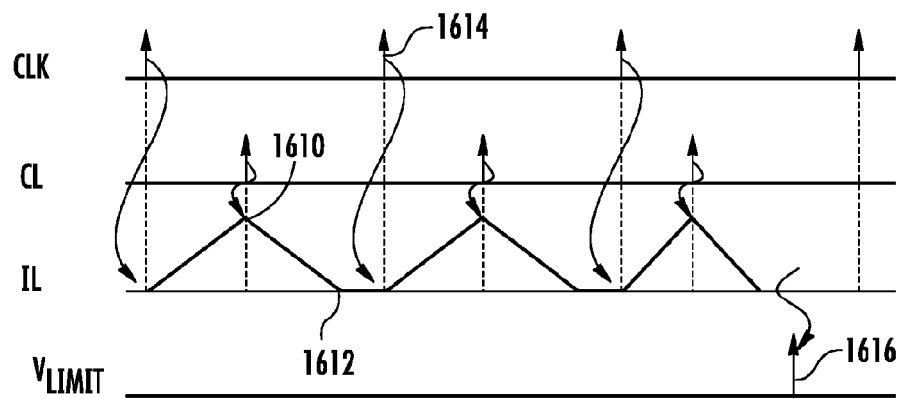

With further reference to FIG. 16A, there is illustrated a timing diagram for the operation of the buck controller 1602. A fixed frequency is provided by the clock circuit 107 wherein a clock edge will initiate a PFM charging operation to close switch S1 and open switch S2, switch S4 remaining open and switch S3 remaining closed. This charging operation will continue until a point 1610 at which time a maximum current limit has been reached. This will switch the operation over to a discharge or transfer mode in which energy is transferred to the load from the inductor 114. This transfer will continue until the current through the inductor is zero, as determined by the buck controller 1602 by sensing the current through transistor 310 with the current sensor 119. At this point, point 1612, the switches S1-S4 will be placed in a tri-state mode and all of the switches will be opened. At the next clock edge, 1614, the next charge operation will occur. This will continue until a voltage limit is determined as having been reached, as indicated by a voltage limit signal 1616. At this time, what will occur is that the switches will be maintained in the tri-state mode and the next clock edge will not initiate another charge operation. If the voltage limit signal 1616 occurs before the current through inductor 114 has decreased to a zero value, the tri-state mode will be delayed until such occurrence, after which all switches will be placed in tri-state mode.

With further reference to FIG. 16, it is noted that a comparator 1618 with hysteresis is provided to compare the input and output voltages. This determines whether the boost mode has moved into the transition buck or boost area as described hereinabove with respect to FIG. 2A. The hysteresis will allow the determination to be made as to whether the input voltage is less than the output voltage by $dV_1$ or is greater than $V_{OUT}$ by a value of $dV_2$. If so, then the boost mode will switch to the buck mode or the buck mode will switch to the boost mode. The boost mode will be maintained until the input voltage is greater than the output voltage by $dV_2$ and the buck mode will remain in the buck mode until $dV_1$ decreases below the output voltage.

Figure 17:
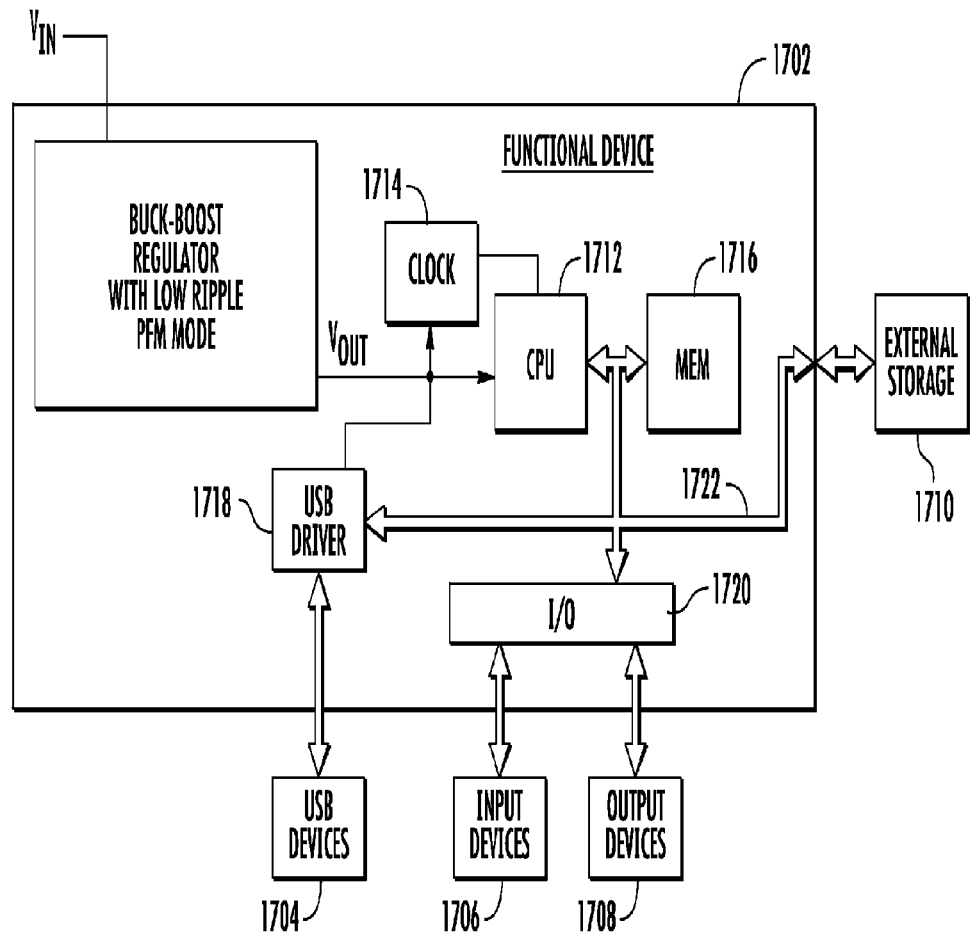
FIG. 17 illustrates an electronic/electric system including electronic/electric circuitry including the switching circuitry according to one embodiment.

Voltage regulators and associated circuitry according to the embodiments of the present disclosure can be embodied as a variety of different types of electronic devices and systems, such as computers, cellular telephone, personal digital assistants, and industrial systems and devices. More specifically, some applications include, but are not limited to, CPU power regulators, chip regulators, point of load power regulators and memory regulators. FIG. 17 is a block diagram of an electronic/electric system or functional device 1702. The functional device 1702 is a device that requires a regulated voltage at a particular and set voltage, this being defined by the operating parameters of the device 1702. For illustrative purposes, the device 1702 includes certain operating blocks such as a CPU 1712, a memory 1716, a clock or timing circuit 1714 that operate together to provide an integrated application specific device. This can be entirely realized in silicon on an integrated circuit or it can be formed of discrete devices. A data bus 1722 is provided to allow communication between components within the device 1702.

To provide power to the device, an external voltage $V_{IN}$ is input to a buck-boost regulator 1701 operating in either a buck mode or a low ripple PFM boost mode. The input voltage can operate over a much larger range than the device operating voltage, such that the regulator 1701 must accommodate voltages that rage from voltages below the operating voltage to voltages above the operating voltage. The operating voltage is labeled $V_{OUT}$ and is illustrated as powering the CPU 1712 and the clock 1714. It is also illustrated as powering a USB driver 1718 that interfaces with an external USB device 1704. For this operation, power from the regulator 1701 is used to power the external USB device 1704. Additionally, there are other external devices that can be interfaced to the device 1702, such as input devices 1706, such as a keyboard and scanner, etc., and output devices 1708 such as an LCD display. Further, external storage 1710 can be accommodated in the form of Flash drives, hard drives, DVDs, etc. These are interfaced with the data bus 1722. There is provided an I/O 1720 to interface between the components on the device 1702 and the input and output devices to provide the various drivers and the such. All of the external devices could be interfaced with the USB driver 1718, providing they are USB interfaceable devices. The regulator 1701 utilizes the PFM boost circuitry described hereinabove to achieve an improved efficiency and lower ripple.

It will be appreciated by those skilled in the art having the benefit of this disclosure that this system and method for high efficiency PWM control of buck-boost converter provides a more efficiently operating buck-boost converter. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:
1. A DC-DC converter, comprising:
an input terminal for receiving an input voltage from an input voltage source disposed at an input voltage level;
an output terminal for providing an output voltage at an output voltage level different than the input voltage level to a load connected to the output terminal;
an energy storage element for receiving and storing energy from the input voltage source on an input side thereof via the input terminal and transferring at least a portion of the stored energy to the load from an output side thereof; and a control system for controlling the storage of energy to and transfer of energy from the energy storage element in at least three recurring phases to attain a desired level for the output voltage level, the three phases comprising an energy storage phase for storing energy from the input terminal in the energy storage element, a first energy transfer phase for transferring only a portion of the stored energy from the energy storage element to the load, and a second energy transfer phase to transfer substantially all of the energy to the load, the control system for initiating the second energy transfer phase in response to a magnitude of the output voltage equaling or exceeding a magnitude of the desired level for the output voltage.

2. The converter of claim 1, wherein the energy storage element comprises an inductor.

3. The converter of claim 1, and further comprising a clock circuit having a fixed frequency and wherein the energy storage phase and the first energy transfer phase are controlled by the control system to occur in a single period of the clock, with the end of the first energy transfer phase occurring at the end of the clock period.

4. The converter of claim 3, wherein the control system is for initiating the second energy transfer phase in response to a condition of the output voltage independent of the clock.

5. The converter of claim 4, further comprising a comparator for determining that the condition exists in response to the magnitude of the output voltage equaling or exceeding the magnitude of the desired level for the output voltage.

6. The converter of claim 3, wherein the energy storage phase stores energy in the energy storage element until a predetermined amount of energy is stored therein, such that the length of time for reaching the predetermined amount of energy varies as a function of the initial amount of energy stored therein at the beginning of the energy transfer phase and the length of time for the first energy transfer phase will change accordingly.

7. The converter of claim 6, wherein the energy storage element comprises an inductor and the predetermined amount of energy is defined by a current limit of the current through the inductor during charging thereof in the energy storage phase.

8. The converter of claim 1, wherein the desired level of the output voltage is higher than the input voltage to provide a boost DC-DC conversion operation.

9. The converter of claim 1, wherein the energy storage element comprises an inductor and the control system comprises:
a switching bridge having first and second switching nodes, each connected to opposite sides of the inductor with a set of first and second input switches for connecting the first switching node to the input terminal with the first input switch and to a reference voltage with the second input switch and a set of first and second output switches for connecting the second switching node to the output terminal with the first output switch and to a reference voltage with the second output switch; and
a switch controller controlling the first and second input switches and first and second output switches to connect the inductor between the input terminal and the reference voltage and, in the first energy transfer phase, to connect the inductor between the input and output terminals and, in the second energy transfer phase, to connect the inductor between the reference voltage and the output terminal.

10. A DC-DC converter, comprising:
an input terminal for receiving an input voltage from an input voltage source disposed at an input voltage level;
an output terminal for providing an output voltage at an output voltage level different than the input voltage level to a load connected to the output terminal;
an energy storage element for receiving and storing energy from the input voltage source on an input side thereof via the input terminal and transferring at least a portion of the stored energy to the load from an output side thereof;
a control system for controlling the storage of energy to and transfer of energy from the energy storage element in at least three recurring phases to attain a desired level for the output voltage level, the three phases comprising an energy storage phase for storing energy from the input terminal in the energy storage element, a first energy transfer phase for transferring only a portion of the stored energy from the energy storage element to the load and a second energy transfer phase to transfer substantially all of the energy to the load;
a clock circuit having a fixed frequency and wherein the energy storage phase and the first energy transfer phase are controlled by the control system to occur in a single period of the clock, with the end of the first energy transfer phase occurring at the end of the clock period; and
wherein the control system sequences the operation of the energy storage phase followed by the first energy transfer phase during sequential periods of the clock until the external condition occurs, such that at the end of a preceding period of the clock, there will be a non zero energy level in the energy storage element and the energy storage phase of a current period will charge the energy storage element from the non zero energy level until the occurrence of the external condition.

11. A buck-boost DC-DC converter, comprising:
an input terminal connected to an input voltage source operating at an input voltage level;
an output terminal connected to a load;
a reference node disposed at a reference voltage level;
a buck-boost conversion circuit, including:
an inductor,
a buck switching section for transferring energy to the inductor and subsequently transferring energy to the load on the output terminal in a voltage buck conversion operation, and
a boost switching section for transferring energy to the inductor and subsequently transferring energy to the load on the output terminal in a voltage boost conversion operation; and
a buck-boost controller for controlling at least the boost switching section to operate in a Pulse Frequency Modulation (PFM) boost mode of operation, the controller including:
a clock operating at a fixed frequency, and
a phase controller to control first and second output switches to operate in a charging phase initiated at an edge of the clock to connect the inductor between the input terminal and the reference voltage node to charge the inductor to a predetermined energy level and then operate in a first energy transfer phase to connect the inductor between the input terminal and the output terminal to transfer energy from the inductor and the input terminal to the output terminal until the occurrence of the next clock edge, wherein the inductor will be at a non zero stored energy level.

12. The converter of claim 11, wherein the buck-boost controller includes a comparator for comparing the voltage level on the output terminal to a desired reference voltage and, when the voltage level on the output terminal equals or exceeds the reference voltage, the phase controller operates the boost switching section and the buck switching section in a second energy transfer phase to connect the inductor between the reference node and the output terminal to transfer substantially all of the energy stored in the inductor to the output terminal to reduce the energy therein to a substantially zero value.

13. The converter of claim 12, wherein the buck-boost controller controls the boost switching section and the buck switching section to disconnect the inductor from the input and output terminals and the reference node at the end of the second energy transfer phase.

14. The convertor of claim 11, wherein the buck-boost controller controls the buck switching section to operate in a PFM buck mode of operation.

15. The converter of claim 14, and further comprising a mode comparator to compare the voltage levels on the input and output terminals and switching between buck and boost modes of operation when the two voltages are within a predetermined voltage.

16. The converter of claim 11, wherein the buck-boost controller further includes a current limit detector to detect the flow of current into the inductor and change phase from the charge phase to the first energy transfer phase when a predetermined inductor current is detected in the charge phase.

17. A method for controlling operation of a buck/boost regulator, the method comprising:
generating a regulated output voltage on an output node responsive to an input voltage received on an input node and a plurality of control signals;
monitoring the regulated output voltage; and
generating a plurality of control signals responsive to the output voltage, wherein the plurality of control signals include a first mode of operation controlling a charge phase of the buck/boost regulator to charge an energy storage element from the input voltage on the input node, a second mode of operation controlling a pass through phase of the buck/boost regulator to both transfer stored energy from the energy storage element to the output node and transfer energy from the input node to the output node, and a third mode of operation controlling a discharge phase of the buck/boost regulator to fully transfer the stored energy in the energy storage element to the output node via a conduction path of at least one closed switch, a conductance of the conduction path responsive to one of the control signals;
wherein the plurality of control signals control the buck/boost regulator to eliminate occurrence of a four switch switching condition.

18. The method of claim 17 further including:
generating the regulated output voltage responsive to an input voltage and the plurality of control signals at the buck/boost regulator; and
operating the buck/boost regulator according the plurality of control signals in one of the first, second or third modes of operation.

19. The method of claim 18, wherein the operating further comprises:
controlling a plurality of switching transistors in the buck/boost regulator to enable a charging phase in the first mode of operation responsive to a clock signal and a current limit signal to charge an inductor to the current responding to the current limit signal; and
controlling the plurality of switching transistors in the buck/boost regulator to enable a pass through phase in the second mode of operation responsive to the clock signal and the current limit signal to both transfer energy stored in the inductor to the output node and transfer current from the input node to the output node such that only a portion of the stored energy in the inductor is transferred to the output node.

20. The method of claim 19, wherein the operating further comprises controlling the plurality of switching transistors to enable a discharge phase in the third mode of operation responsive to a voltage limit signal to fully transfer the energy stored in the inductor to the output node with no energy transferred to the output node from the input node.

21. A method for controlling operation of a buck/boost regulator, comprising:
generating a regulated output voltage on an output node responsive to an input voltage received on an input node and a plurality of control signals;
monitoring the regulated output voltage;
generating a plurality of control signals responsive to the output voltage, wherein the plurality of control signals include a first mode of operation controlling a charge phase of the buck/boost regulator to charge an energy storage element from the input voltage on the input node, a second mode of operation controlling a pass through phase of the buck/boost regulator to both transfer stored energy from the energy storage element to the output node and transfer energy from the input node to the output node, and a third mode of operation controlling a discharge phase of the buck/boost regulator to fully transfer the stored energy in the energy storage element to the output node via at least one closed switch;
wherein the plurality of control signals control the buck/boost regulator to eliminate occurrence of a four switch switching condition;
generating a voltage limit signal indicating when the regulated output voltage exceeds a reference voltage;
generating a current limit signal indicating when an input current to the energy storage element during the charge phase of the buck/boost voltage regulator exceeds a predetermined current limit reference signal;
generating a first portion of a plurality of control signals to control a pair of boost switching transistors of a plurality of switching transistors that switch one side of the energy storage element to a reference voltage during the charge phase and to the output node during the pass-through phase and discharge phase associated with the buck/boost regulator responsive to the voltage limit reference signal, the current limit signal and a clock signal; and
generating a second portion of the plurality of control signals to control a pair of buck switching transistors of the plurality of switching transistors associated with the buck/boost regulator that connect another side of the energy storage element to either the reference voltage during the discharge phase or the input node during the pass-through phase responsive to the voltage limit signal.

22. A system, comprising:
a buck/boost voltage regulator for generating a regulated output voltage on an output node responsive to an input voltage received on an input node and drive control signals, the buck/boost voltage regulator including a plurality of switching transistors;

control circuitry for monitoring the regulated output voltage and generating the plurality of drive control signals responsive thereto, wherein the control circuitry controls the operation of the plurality of switching transistors to enable a charging phase in a first mode of operation to store energy in an inductor from the input node, a pass through phase in a second mode of operation to transfer only a portion of the energy stored in the inductor to the output node and transfer energy from the input node to the output node, and a discharge phase in a third mode of operation where the energy in the inductor is fully transferred to the output node via at least an on one of the switching transistors to eliminate occurrence of a four switch switching condition; and a load coupled to the output of the buck/boost voltage regulator.

23. The system of claim 22, wherein the load is selected from a group consisting of a processor, a memory, an input device, an output device and a storage device.

* * * * *